Oct. 8, 1929.   A. J. SHERBURNE   1,731,179
PHONOGRAPH NEEDLE
Filed March 22, 1928

Impregnated with Alkyd Resin

Inventor:
Arthur J. Sherburne,
by Charles A. Mullen
His Attorney.

Patented Oct. 8, 1929

1,731,179

UNITED STATES PATENT OFFICE

ARTHUR J. SHERBURNE, OF SCHENECTADY, NEW YORK, ASSIGNOR TO GENERAL ELECTRIC COMPANY, A CORPORATION OF NEW YORK

PHONOGRAPH NEEDLE

Application filed March 22, 1928. Serial No. 263,917.

The present invention relates to styli or needles for sound reproducing machines and it is the object of my invention to provide non-metallic styli which are capable of accurate reproduction of sound without causing appreciable wear of the records.

Styli made of cellulose fibres, such as bamboo, or wood, cause no appreciable wear on a sound record and give a soft-toned reproduction. However, for many purposes such styli are not well suited. For example, they do not have a natural frequency of vibration characteristic which is suitable for some types of sound reproducers, hence their sound reproduction is lacking in fidelity and brilliancy. They are unable to reproduce big volume of sound and they are particularly unsuited for use with records having deeply cut grooves, such as the records which are electrically recorded. In many cases a fibre needle is not capable of use throughout an entire record, the edge of the needle becoming split and dulled. Moreover, the quality of tone is greatly impaired by moisture absorbed in the pores of fibre needles.

I have discovered that when porous, non-metallic needles, such as the bamboo needles, contain a hardened resin of the alkyd resin type, and in particular an alkyd resin containing a drying oil acid, long wearing and improved tonal qualities result.

Figure 1:
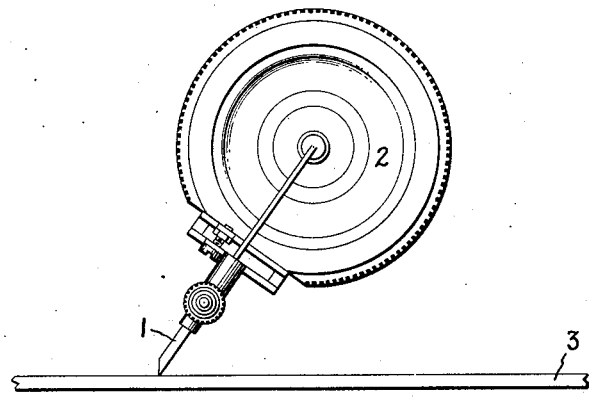
Figure 2:
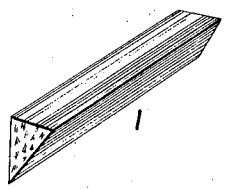

The accompanying drawing shows in Fig. 1 a side elevation of a sound reproducing device containing a needle embodying my invention and Fig. 2 shows on an enlarged scale a triangular, fibre needle treated in accordance with my invention.

The alkyd resins which are utilized for the purposes of my invention contain a polyhydric alcohol, such as glycerine and a polybasic acid, such as phthalic acid, or succinc acid or malic acid, and preferably also containing in addition to such ingredients a drying oil acid, such as the acid or mixed acids derived from linseed oil, China wood oil, or Perilla oil. Oxygen convertible resins, containing in combination a drying oil acid were known prior to my invention and are described in an article by Kienle and Ferguson in Ind. & Engr. Chem. for April 1929, Vol. 21, page 349. Styli or needles of dried bamboo, or other suitable porous woody material, are impregnated with the resin when in the fusible, soluble stage, the resin preferably being thinned with a solvent. Alkyd resin consisting solely of glycerine and phthalic anhydride also may be used for the impregnation.

The following is an example of a resin preferred for carrying out my invention: About 92 parts by weight of glycerine and 92 parts by weight of phthalic anhydride are heated to produce reaction, the temperature gradually rising to about 200° C. At this temperature addition is made of 74 parts by weight of phthalic anhydride and about 140 parts by weight of the drying oil acid. Heating is continued within a temperature range of about 190 to 210° C. until reaction is completed and a clear liquid is formed. In some cases it is desirable to carry out the reaction in one stage. By weight, 370 parts of phthalic anhydride and about 140 parts of fatty acids derived from drying oil are melted at about 160° C. and about 92 parts of glycerine are added to the melt. Heating is continued at a temperature rising to about 200° C. to produce a resin.

Styli of bamboo, or other desired cellulose product, are carefully dried, preferably in a vacuum, and then are impregnated with the desired resin. For example, the material to be impregnated is dried in an evacuated chamber and a solution of the resin is introduced into contact with the material in the vacuum. As a solvent I may employ a mixed solvent containing one part alcohol and one part benzol, if the styli are to be baked at 90° to 100° C. For air drying, I prefer a mixed solvent containing 5 parts solvent naphtha, 5 parts toluol, and 2 parts butanol. Other solvents may be used.

The impregnated styli are freed of excess liquid, for example by placing on blotting paper, or other absorbent material. The resin in the needles is hardened by contact with the air for a sufficient length of time at room temperature or by baking at a moderate heat, say at about 100° C.

The needles thus prepared are hard and dense but will not mechanically injure records as will metallic needles. Their reproducibility is clear and brilliant. The impregnated needle 1 is used as shown in Fig. 1 with the well known form of reproducer 2 in conjunction with a molded, grooved record 3. Improved sound reproduction is due not only to the improved hardness of the engaging point but to the increased density of the impregnated needle and to its increased resistance to moisture absorption. Its response to sound records over the scale of audible frequency is equal or superior to that of a metallic needle. A bamboo needle embodying my invention can be used to play about five to ten loud electrically engraved sound records before requiring trimming.

What I claim as new and desire to secure by Letters Patent of the United States, is:

1. A stylus for sound reproducing machines having a record-engaging tip consisting mainly of cellulose fibres impregnated with a hardened alkyd resin.

2. A stylus for sound reproducing machines comprising bamboo impregnated with a hardened mixed ester of polyhydric alcohol, polybasic acid and drying oil acid.

In witness whereof, I have hereunto set my hand this 21st day of March, 1928.

ARTHUR J. SHERBURNE.